United States Patent
Fehrenbach et al.

(10) Patent No.: US 10,502,610 B2
(45) Date of Patent: Dec. 10, 2019

(54) PROPAGATION TIME SENSOR COMPRISING A LONG-TERM ENERGY STORE

(71) Applicant: VEGA GRIESHABER KG, Wolfach (DE)

(72) Inventors: Josef Fehrenbach, Haslach (DE); Karl Griessbaum, Muhlenbach (DE)

(73) Assignee: VEGA GRIESHABER KG, Wolfach (DE)

( * ) Notice: Subject to any disclaimer, the term of this patent is extended or adjusted under 35 U.S.C. 154(b) by 294 days.

(21) Appl. No.: 15/380,839

(22) Filed: Dec. 15, 2016

(65) Prior Publication Data

US 2017/0167911 A1    Jun. 15, 2017

(30) Foreign Application Priority Data

Dec. 15, 2015 (DE) .......... 10 2015 225 303

(51) Int. Cl.
| | |
|---|---|
| *G01F 23/00* | (2006.01) |
| *G01F 23/296* | (2006.01) |
| *G01F 23/28* | (2006.01) |
| *G01S 7/03* | (2006.01) |
| *G01S 13/08* | (2006.01) |

(52) U.S. Cl.
CPC .......... *G01F 23/2962* (2013.01); *G01F 23/00* (2013.01); *G01F 23/28* (2013.01); *G01S 7/032* (2013.01); *G01S 13/08* (2013.01)

(58) Field of Classification Search
CPC ........................ G01F 23/0061–0092
See application file for complete search history.

(56) References Cited

U.S. PATENT DOCUMENTS

| | | | |
|---|---|---|---|
| 4,400,976 A | 8/1983 | Blades | |
| 5,765,995 A * | 6/1998 | Springer | ................. F04B 17/05 |
| | | | 123/179.4 |
| 6,014,100 A | 1/2000 | Fehrenbach et al. | |
| 6,680,690 B1 | 1/2004 | Nilsson et al. | |
| 2004/0124854 A1 | 7/2004 | Slezak | |
| 2005/0168379 A1 | 8/2005 | Griessbaum et al. | |
| 2008/0279044 A1 | 11/2008 | Hafer et al. | |
| 2010/0076604 A1 * | 3/2010 | Johnson | ............... G05B 19/042 |
| | | | 700/275 |
| 2011/0093129 A1 | 4/2011 | Nilsson et al. | |
| 2011/0156918 A1 | 6/2011 | Pedrosa Santos | |
| 2012/0162003 A1 | 6/2012 | Nilsson | |

FOREIGN PATENT DOCUMENTS

| | | |
|---|---|---|
| CN | 101223422 A | 7/2008 |
| CN | 103090930 A | 5/2013 |
| DE | 28 40 848 A1 | 4/1979 |
| EP | 2 228 632 A1 | 9/2010 |
| GB | 2 005 415 A | 4/1979 |

OTHER PUBLICATIONS

Office Action dated Jul. 23, 2019, in China Patent Application No. 201611151225.2. (9 pgs.).

* cited by examiner

*Primary Examiner* — Lisa M Caputo
*Assistant Examiner* — Alex T Devito
(74) *Attorney, Agent, or Firm* — Oblon, McClelland, Maier & Neustadt, L.L.P.

(57) ABSTRACT

A fill level measurement device including a long-term energy store, the discharging of which is prevented by a diode and a switch or by two switches when the fill level measurement device is switched off. Therefore, energy is storable for a long period of time, even if the field device is switched off.

12 Claims, 4 Drawing Sheets

PROPAGATION TIME SENSOR COMPRISING A LONG-TERM ENERGY STORE

REFERENCE TO RELATED APPLICATIONS

This application claims the benefit of the filing date of German Patent Application No. 102015225303.1 filed on 15 Dec. 2015, the disclosure of which is hereby incorporated herein by reference.

FIELD OF THE INVENTION

The invention relates to a fill level measurement device comprising a long-term energy store, the invention in particular relating to a fill level measurement device in the form of a radar, TDR or ultrasonic propagation time sensor.

TECHNICAL BACKGROUND

Fill level measurement devices, and in particular propagation time sensors for fill level measurement which function according to the radar, TDR (time domain reflectometry) or ultrasound principle generally have an energy consumption that fluctuates significantly and is caused by the alternation between energy-intensive measurement phases and evaluation phases or dead times having a considerably lower energy requirement.

If such a fill level measurement device is connected to a two-wire loop, the energy intake resulting from the two-wire operation (4-20 mA or a constant current having superposed digital communication) is at least temporarily constant and the resultant electrical power currently available can be less than the power currently required in the measurement phase.

This requires a buffer store for storing energy in order to bridge a temporary power deficit.

Propagation time sensors that comprise an accumulator for supplying energy for a long time are also known, which accumulator, however, is not charged via a two-wire loop. Said accumulator has to be charged separately at a given time.

SUMMARY OF THE INVENTION

One aspect of the invention relates to a fill level measurement device which comprises a connection for an external energy supply, by means of which the fill level measurement device can be connected to the external energy supply. Sensor electronics are provided which are designed to detect an electrical sensor signal from which a fill level can be deduced. The sensor signal can be an echo curve, for example.

Furthermore, the fill level measurement device comprises a long-term energy store which can be charged by means of the external energy supply and is designed as a source of energy for charging a buffer capacitor or for directly compensating for a fluctuating energy consumption of the fill level measurement device. In the former case, the buffer capacitor is used to compensate for the fluctuating energy consumption of the fill level measurement device, it being possible, however, for said capacitor to be charged by the long-term energy store.

Furthermore, a first component is provided which is connected to the long-term energy store in order to prevent current from flowing from the long-term energy store towards the connection. Furthermore, a second component is provided which is connected to the long-term energy store in order to prevent current from flowing from the long-term energy store towards the sensor electronics when the fill level measurement device is not supplied with energy by the external energy supply.

This may provide a fill level measurement device having a long-term energy store that reliably supplies the fill level measurement device with energy over a long period of time.

The first component is a diode or a switching unit, for example. The second component is, for example, a switching unit which interrupts the connection between the long-term energy store and the sensor electronics when the fill level measurement device is not supplied with energy by the external energy supply or is switched off.

If the energy supply is reinstated or if the fill level measurement device is switched back on again, the switching unit is switched so that current can now flow between the long-term energy store and the sensor electronics once again.

The first switching unit can also function in a corresponding manner.

The long-term energy store can be, for example, a Supercap or an EDLC (electric double-layer capacitor), or also an accumulator.

According to another embodiment of the invention, the external energy supply is a 4-20 mA two-wire loop, by means of which the fill level measurement device can be supplied with energy for the measurement operation and by means of which the measured value can be communicated to an external apparatus.

According to another embodiment of the invention, the long-term energy store is also designed to supply energy to an element or component of the fill level measurement device when the fill level measurement device is switched off. This element or component is, for example, a real-time clock (RTC) or a digital memory for ensuring the data retention thereof.

According to another embodiment of the invention, the fill level measurement device comprises a battery and a switching unit which connects the battery (this can also be an accumulator) to the long-term energy store. The battery and the switching unit are designed to supply the long-term energy store with energy only when the fill level measurement device is switched off. In other words, the switching unit interrupts the connection between the battery and the long-term energy store when the fill level measurement device is switched on and establishes the connection when the fill level measurement device is switched off.

According to another embodiment of the invention, the fill level measurement device comprises both a buffer capacitor for compensating for the fluctuating energy consumption of the fill level measurement device, and a switching unit which connects the long-term energy store to the buffer capacitor and is designed such that the long-term energy store charges the buffer capacitor only after the fill level measurement device has been switched on.

According to another embodiment of the invention, the fill level measurement device comprises both a first buffer capacitor for compensating for the fluctuating energy consumption of the fill level measurement device, and a second buffer capacitor which is connected in series with the parallel connection of a resistor to a switching unit. The aforementioned series circuit is in turn connected in parallel with the first buffer capacitor. If the switching unit is connected in a highly ohmic manner, the process of charging the second buffer capacitor by the action of the resistor is slower, i.e. delayed, in comparison with the process of charging the first buffer capacitor. If, on the contrary, the switching unit is connected in a low-ohmic manner, the two capacitors interact as capacitors connected in parallel.

According to another embodiment of the invention, a current-limiting circuit is provided, which is designed to supply the long-term energy store only with the energy from the external energy supply that is not required by the communication circuit and the measurement electronics of the fill level measurement device.

According to the invention, the following problems can be prevented:

- long start times for the sensor due to the charging of energy stores;
- loss of energy during switch-off due to the discharging of energy stores, which can be particularly disruptive during interval operation, in which measured values are only generated at long time intervals, for energy reasons;
- space/cost requirement as a result of a large temporary energy store;
- problems at low supply voltages due to limited capacitance of the energy store.

Advantages of the fill level measurement device can in particular be considered to be:

- quick start times, since slow charging of energy stores when the fill level measurement device is switched on can be omitted or significantly reduced by using energy from the long-term energy store;
- reduced energy outflow after switching off;
- better "smoothing" of the energy consumption due to larger overall capacitance of the energy store(s) and therefore better suitability for supplying the fill level measurement device with a smaller supply voltage;
- improved adaptation to interval operation of the fill level measurement device, in which measured values are only generated at long time intervals, for energy reasons (for example an independently supplied field device having a radio connection);
- long-term energy store can be simultaneously used as a backup energy source for switching parts, the functions of which also need to be maintained to some degree without a supply voltage (for example a real-time clock, digital memory for storing events, parameters or an executable software code).

In the following, embodiments of the invention will be described with reference to the figures.

DETAILED DESCRIPTION OF EMBODIMENTS

Figure 1:
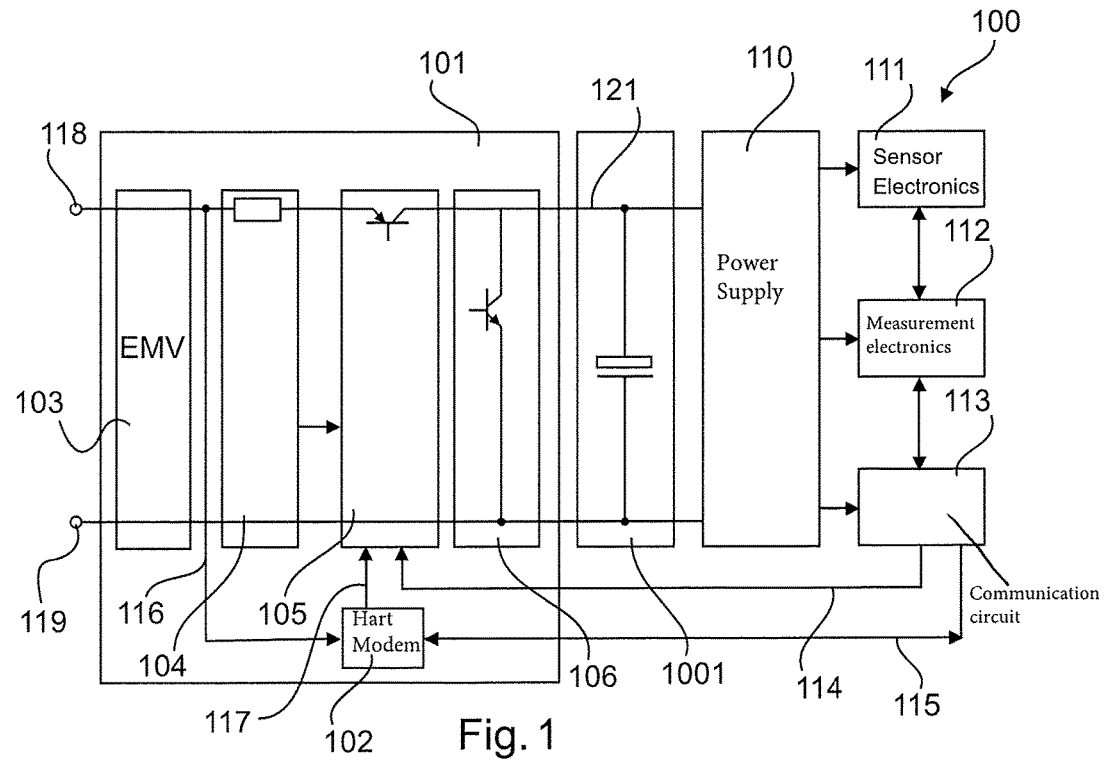
FIG. 1 is a block diagram of a fill level measurement device.

The views in the drawings are schematic and not to scale.

Where the same reference numerals are used in different figures in the following description of the figures, these denote the same or similar elements. However, the same or similar elements may also be denoted by different reference numerals.

FIG. 1 is a block diagram of a fill level measurement device 100 comprising connections 118, 119 for connection to a two-wire line (current loop). By means of the two-wire line, the measurement device 100 is supplied with the energy required for operating the device and the measured value from the fill level measurement is transmitted to a remote terminal (not shown in this case) that is also connected to the two-wire line. The fill level measurement device comprises a sensor-loop interface 101 which comprises an EMC input circuit 103 for limiting the current, limiting the voltage, EMC filtering and optionally explosion protection. Furthermore, said interface comprises a controller 105 for the loop current that flows in the two-wire line, comprising an actual loop current value detection 104 and a default target loop current value 114 and a parallel branch (shunt) 106.

The actual loop current value detection (current sense) 104 is used to sense the actual current value as an input variable for the current controller 105.

The current controller 105 is used to control the loop current at the desired output current which, in the embodiment shown, represents the measured value in the current loop. Said controller compares the actual current value with the target current value 114, which is provided by the communication circuit 113. This form of analogue measured value transmission via the two-wire line is, for example, known as a 4-20 mA two-wire loop and is widely used.

It should be pointed out that it is also possible to digitally transmit the measured value via a two-wire line. In this case, the loop current, for example, is constantly kept in the middle by the current controller 105. The measured value can be transmitted in digitised form by modulating the current using a corresponding AC voltage signal.

The shunt 106 deduces the fraction of the total current (loop current) which is not taken in by the subsequent circuit of the sensor. Said shunt is designed as a voltage limitation or voltage control (for example control of a predetermined voltage drop across the series pass transistor of the current controller 105).

If, in addition to or instead of the analogue measured value transmission, digital communication is to take place between the fill level measurement device 100 and a remote terminal (not shown) via the two-wire line, this can for example occur by means of the standardised HART communication. For this purpose, the fill level measurement device 100 contains a HART modem 102. The HART modem 102 receives the HART request signal from the master (remote communication terminal; not shown) via the two-wire line, and modulates the HART response signal to the loop current by means of the current controller 105. Said modem receives or forwards HART data from/to the communication circuit 113.

The energy store or buffer store 1001 is used to buffer energy in order to compensate for energy peaks. It discharges once the sensor has been disconnected from the current loop and has to first be charged slowly after being switched on (in other words once the sensor has been connected to the current loop). The size of the energy store depends on the ratio of the average energy intake to the maximum energy intake of the sensor, and to the difference between the maximum and minimum permissible voltage at the buffer capacitor.

The power supply 110 can be designed as a power supply circuit for supplying power to all the functional units (circuit parts) and contains, for example, a switching controller (step-down controller, step-up controller), a voltage controller and smoothing capacitors for providing stabilised output voltages.

The sensor electronics 111 are a circuit part for generating an electrical sensor signal which is related to the measured value or from which the measured value can be calculated or deduced. It is used for converting a physical measured variable (for example the propagation time of the measured signal from the sensor to the filling material surface and back) into an electrical signal (for example an echo curve) and contains, for example, high-frequency circuit parts (transmitter, receiver, coupler, antenna, mixer, and amplifier).

The measurement electronics 112 are a circuit part for evaluating the electrical sensor signal and for calculating or deducing a corresponding measured value from the electrical sensor signal (for example in the form of an echo curve evaluation, clutter treatment, determining the output value, etc.). Said electronics control the cyclically repeated measurement and organises the energy management of the overall measurement device.

The communication circuit 113 organises all communications between the sensor and the outside world, transmits the output value (current value) to the current controller, organises the HART communication, organises communication with an optional display and operating unit (not shown) and contains optional circuit parts for wireless communication.

The fill level measurement device 100 can be connected to an external energy supply by means of the connections 118, 119. In the embodiment shown, the external energy supply is a two-wire line (4-20 mA).

The energy store 1001 is arranged between the sensor-loop interface 101 and the power supply 110. The power supply 110 supplies the sensor electronics 111, the measurement electronics 112 and the communication circuit 113 with electrical energy and is supplied with energy itself by the two-wire loop. The energy store 1001 is also supplied with energy by the two-wire loop and ensures direct compensation for a fluctuating energy consumption of the fill level measurement device 100.

The communication circuit 113 sends the current controller 105 a target output current value via the line 114. The HART modem 102 is in communication with the communication circuit 113 via the line 115 and can emit signals to the current controller 105 via the line 117.

A supply line 121 leads to the power supply circuit 110 from the connection 118. The units 103, 104, 105, 106 and the energy store 1001 are connected to this supply line or are looped therein.

Figure 2:
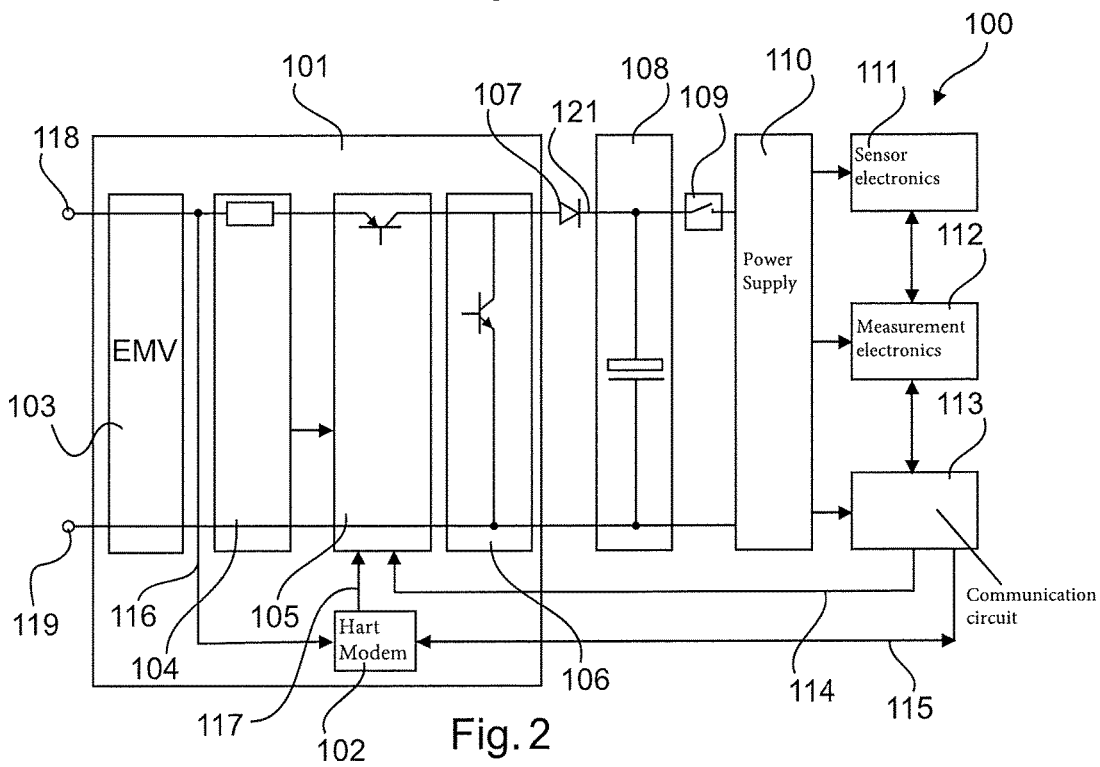
FIG. 2 is a block diagram of a fill level measurement device according to a first embodiment of the invention.

FIG. 2 is a block diagram of a fill level measurement device 100 according to one embodiment of the invention. The energy store 1001 of the circuit in FIG. 1 is replaced with a long-term energy store 108. Furthermore, additional measures are provided which are used to conserve the stored energy when the fill level measurement device is disconnected from the current loop (switched-off state). This is a first component 107 which is formed as a diode. Alternatively, said component can also be formed as a switching unit. Said first component 107 prevents the long-term energy store 108 from discharging towards the two-wire loop (i.e. in the direction of the connections 118, 119). The diode 107 is therefore located between the long-term energy store 108 and one of the connections 118, 119.

Furthermore, a second component 109 is provided which is formed as a switching unit, for example, and is located between the long-term energy store 108 and the power supply 110. This switching unit is highly ohmic when the fill level measurement device is switched off (i.e. when the fill level measurement device is disconnected from the current loop) and prevents the long-term energy store being discharged through the sensor circuit comprising the components: sensor electronics 111, measurement electronics 112 and communication circuit 113. The switching unit can be, for example, a field effect transistor in the form of a series switch.

Advantageous long-term energy stores are usually only suitable for low voltages (for example from 3 to 5 V). If the energy store is discharged as a result of being switched off for a prolonged amount of time, it takes a correspondingly long time for said store to be charged again when it is switched back on. This process can lead to a longer start time for the fill level measurement device.

A long-term energy store 108 is, in the context of the present invention, an energy store which can preferably store (hold) its energy, irrespective of the state of the conducted supply for the fill level measurement device. Irrespective of the external energy supply for the sensor via the two-wire line, the charge in the long-term energy store remains largely conserved. This is ensured by the components 107, 109, which prevent energy outflow towards the fill level measurement device connection and the sensor circuit.

Figure 3:
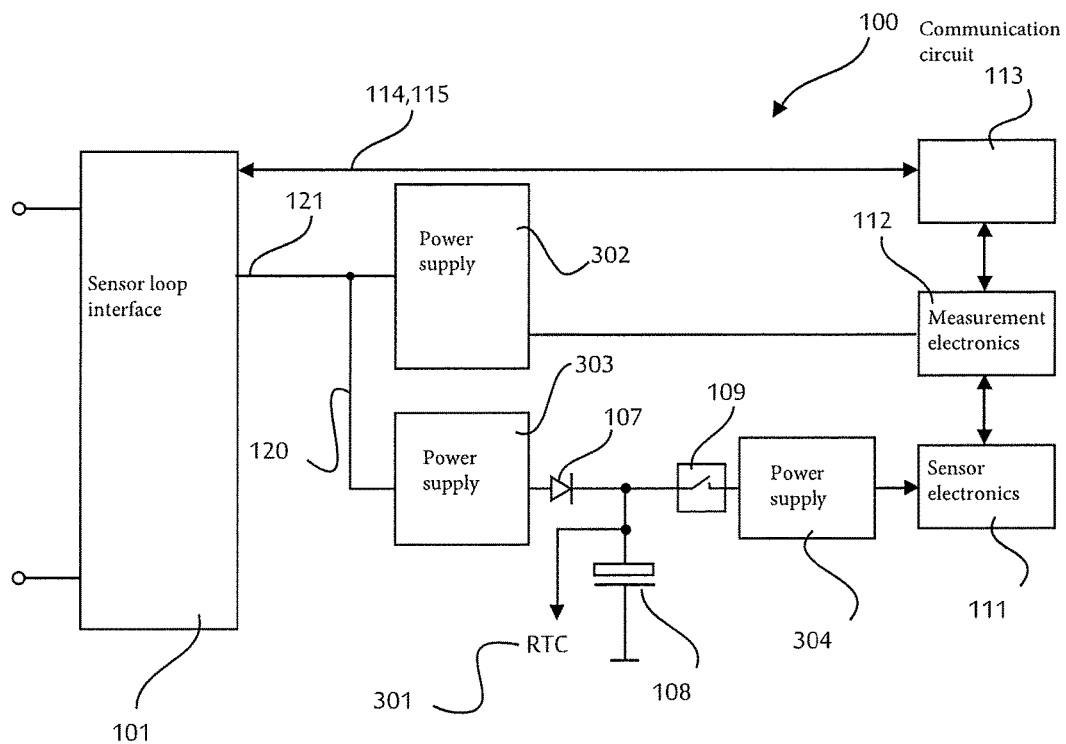
FIG. 3 is a block diagram of a fill level measurement device according to another embodiment of the invention.

FIG. 3 is a block diagram according to another embodiment of the invention.

In contrast to the embodiment in FIG. 2, the long-term energy store 108 is not used as an energy buffer for the entire sensor circuit 111, 112, 113 (in the case in FIG. 2, said energy store is directly upstream of the (only) power supply 110 of the sensor circuit), but only for buffering energy for the sensor electronics 111, since the energy peaks are at least primarily caused by said sensor electronics. Due to the usually low electric strength of long-term energy store capacitors, the voltage at the output of the sensor-loop interface 101 across part 303 of the power supply is converted to a lower voltage (step-down controller, output voltage of 4 V, for example). The long-term energy store 108 is located downstream of this part of the power supply. The diode 107, which prevents a reverse current flow towards the sensor-loop interface 101, is located between the long-term energy store 108 and the part 303 of the power supply. An additional part 304 of the power supply that supplies the sensor electronics 111 with power is located downstream of the long-term energy store. This part 304 comprises a step-down converter, for example, which ensures that the sensor electronics 111 can be operated at 3.3 V, for example.

The second component 109, in the form of a switching unit, is arranged between the long-term energy store 108 and the second part 304 of the power supply in order to prevent current from flowing from the long-term energy store towards the sensor electronics 111 when the field device is switched off or disconnected from the external energy supply.

The third part 302 of the power supply supplies the communication circuit 113 and the measurement electronics 112 with power, but not the sensor electronics 111 (the parts 303, 304 of the power supply that are connected in series and between which the long-term energy store 108 together with the two components 107, 109 is arranged, are responsible for supplying said sensor electronics with power).

Certain circuit parts which are designed such that they can also be operated using a very small amount of energy can be kept functional by means of the long-term energy store 108, even when the field device is switched off Said field device is for example a real-time clock (RTC) 301. In this state, the long-term energy store can also ensure that digital memories retain data by supplying the digital memories with the extremely low amount of energy required for this purpose.

Figure 4:
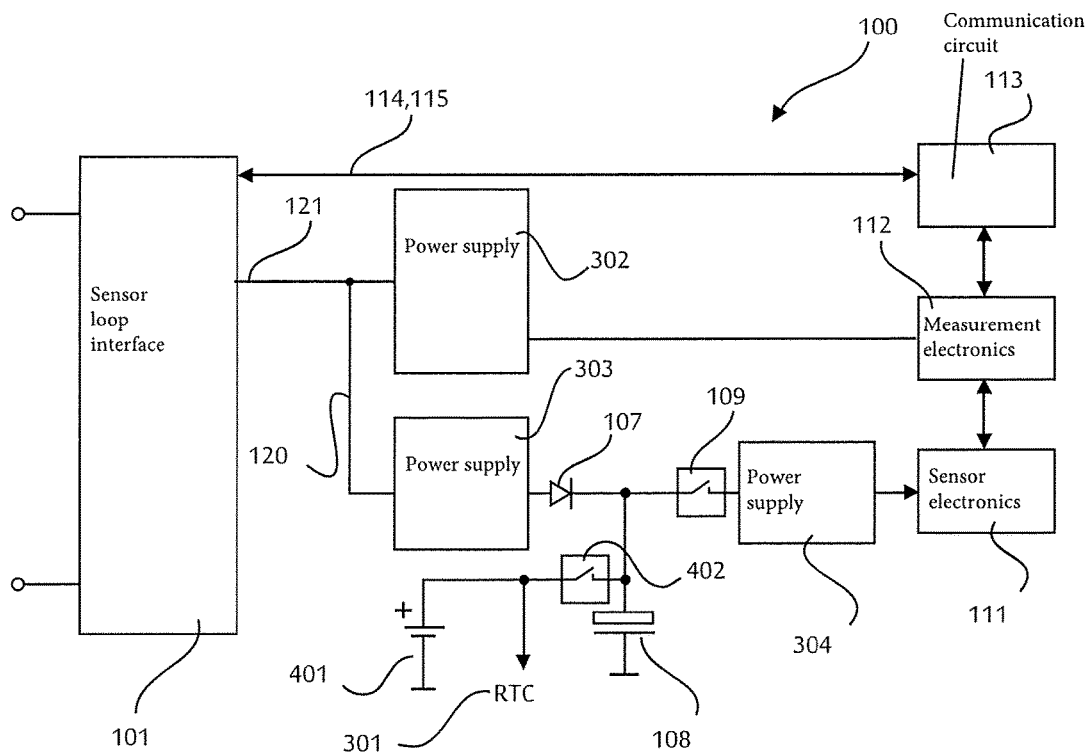
FIG. 4 is a block diagram of a fill level measurement device according to another embodiment of the invention.

FIG. 4 is a block diagram according to another embodiment of the invention. In this case, the long-term energy store 108 is supplied with energy by an additional battery or an additional accumulator 401 when the fill level measurement device is switched off, as a result of which long charging times for a long-term energy store 108 when the fill level measurement device is switched on can be reduced or omitted altogether.

A switching unit 402 can be provided, which is arranged between the long-term energy store 108 and the additional energy supply 401 as well as the real-time clock 301, and the connecting line between the two components 401, 108 only closes when the fill level measurement device has reached the switched-off state or is already switched off. The switching part 301 is likewise also only supplied with energy by the long-term energy store 108 when the fill level measurement device is switched off.

The switches 109 and 402 therefore function completely contrary to one another. If one switch switches to continuity, the other switch opens, and vice versa.

The two switches 109, 402 could also be combined (to form one switch), which switches back and forth between two conductive paths.

Figure 5:
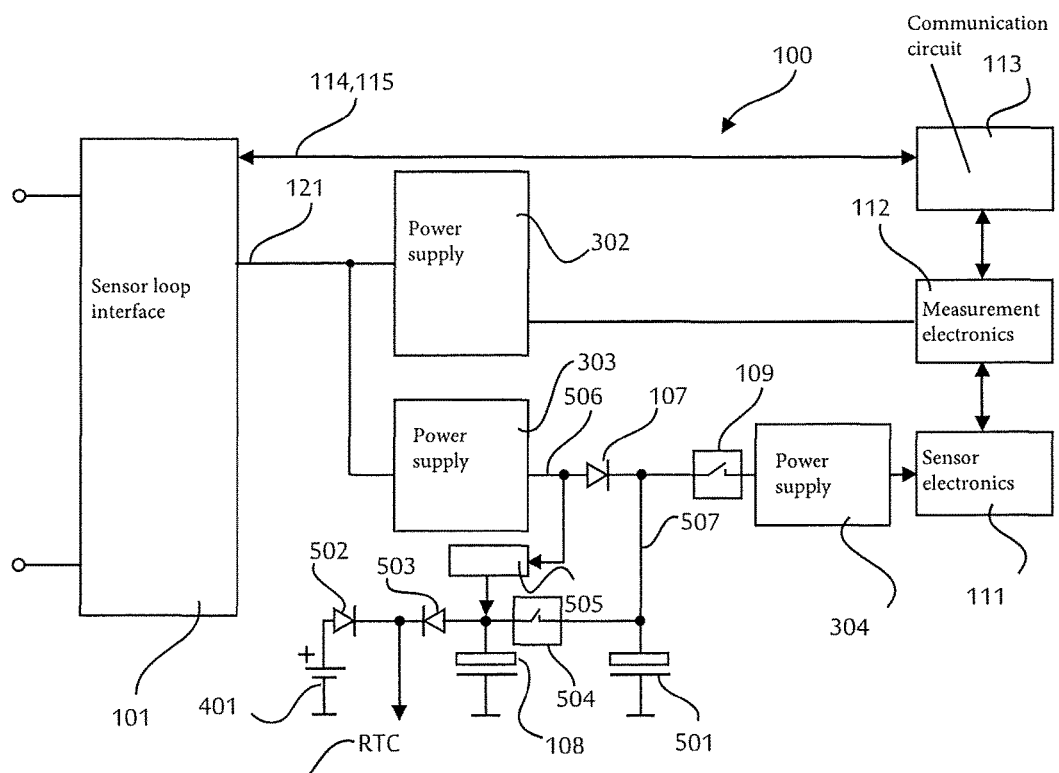
FIG. 5 is a block diagram of a fill level measurement device according to another embodiment of the invention.

FIG. 5 is a block diagram of a fill level measurement device according to another embodiment of the invention. In contrast to the embodiment in FIG. 4, the long-term energy store 108 does not directly buffer the energy peaks substantially caused by the sensor electronics 111. Instead, a "normal" storage capacitor 501 is provided as a buffer capacitor for directly buffering said energy peaks. The long-term energy store 108 is advantageously used to charge the buffer capacitor 501 as quickly as possible once the fill level measurement device has been switched on. This results in very short start times for the field device or very short times between switching on and recording the first measured value.

In this embodiment as in all other embodiments, it can be provided for the long-term energy store to supply one or more circuit parts, such as the real-time clock 301, with energy when the fill level measurement device is switched off. Alternatively to the switching unit 402 in FIG. 4, a diode can be provided which is arranged between the real-time clock 301 and the long-term energy store 108 and prevents current from flowing from the energy store 401 to the long-term energy store 108. A diode 502 is also provided between the real-time clock 301 and the battery 401, which diode is arranged opposite the above-mentioned diode 503 and prevents current from flowing from the long-term energy store 108 to the battery 401. However, on account of this circuit, the current can flow both from the battery 401 and from the long-term energy store 108 to the real-time clock 301.

The long-term energy store 108 together with the buffer capacitor 501 is located downstream of the first power supply unit 303 and upstream of the second power supply unit 304 (for the sensor electronics 111). A charging unit 505 branches off directly downstream of the first power supply unit 303, to which charging unit the long-term energy store 108 is connected and which is responsible for charging the long-term energy store 108 using energy from the two-wire loop. This energy can also be used for the real-time clock 301.

The charging unit 505 branches off from the connecting line 506 between the first power supply 303 and the second power supply 304. Downstream of said branch, the diode 107 is located in the connecting line 506, followed by a second branch 507 which is connected to the buffer capacitor 501 and to the long-term energy store 108 by means of the switching unit 504. The switching unit 504 is closed either during or after the fill level measurement device has been switched on, so that the long-term energy store 108 can charge the buffer capacitor 501. At the same time or thereafter, the switching unit 109 is also closed so that the energy stored in the buffer capacitor can be used for the sensor electronics 111.

In additional embodiments not shown here, in contrast to FIG. 5 the charging unit branches off from other suitable points in the circuit. In principle, any points in the circuit which can provide the energy for powering the charging circuit from the two-wire loop can be suitable. For example, these points are the outputs of the power supplies 302, 303, 304 or the input lines thereof. In other words, it is only the fact that the charging unit 505 obtains its energy from the two-wire loop that is essential to the invention, and not via which path this happens.

It still needs to be mentioned in this connection that the charging circuit 505 may only permit current to flow towards the long-term energy store 108, and never in the opposite direction, away from the energy store 108. In the simplest case, a diode is used for this.

Figure 6:
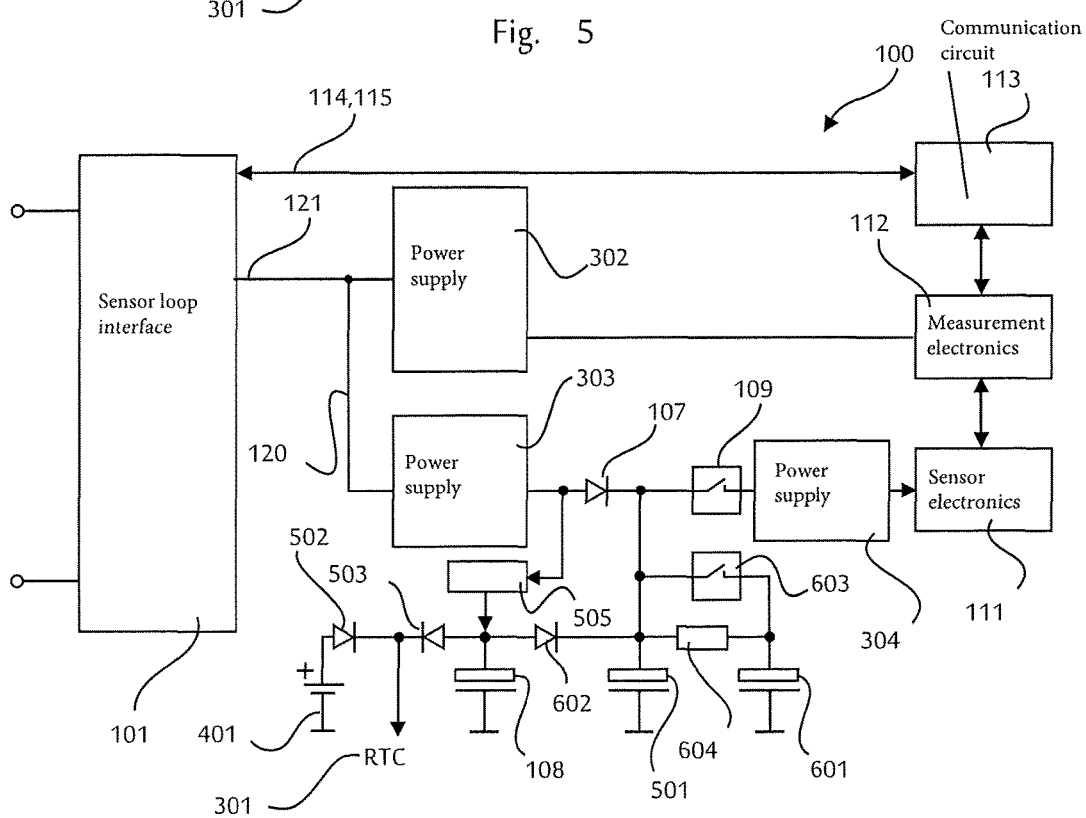
FIG. 6 is a block diagram of a fill level measurement device according to another embodiment of the invention.

FIG. 6 is a block diagram according to another embodiment of the invention. In contrast to the block diagram in FIG. 5, the long-term energy store 108 is charged by the charging circuit 505 to a suitable voltage (for example 4 V). The normal storage capacitor 501 is operated at higher voltages in accordance with the supply voltage at the connections 118, 119 or the output voltage of the sensor-loop interface 101 (for example 8 V). Instead of the switching unit 504 between the long-term energy store 108 and the first buffer capacitor 501, a diode 602 can also be provided which permits current to flow between the long-term energy store 108 and the first buffer capacitor 501 but inhibits current flow in the opposite direction.

As a result of the long-term energy store 108 supporting the first buffer capacitor 501, less time is required, once the fill level measurement device has been switched on, for said device to be sufficiently charged to be able to carry out the first measurement. In order to reduce this time even further, a "conventional" buffer capacitor 501 having a relatively low capacitance is used until the first measured value is recorded. Subsequently, in order to improve the energy efficiency, an additional capacitor 601 that has been slowly charged beforehand is connected in parallel with the buffer capacitor 501. The capacitance of the long-term energy store 108 is typically from a few millifarad to a few farad, whereas the capacitance of the buffer capacitor 501 in is in the range of a few 100 microfarad. The capacitance of the additional capacitor 601 is typically at least exactly as large as that of the capacitor 501, preferably approximately two to three times greater than this.

If the fill level measurement device is switched on, the first buffer capacitor 501 is thus charged first. The long-term energy store 108 and the energy from the two-wire line assists in this case. Therefore, the first measurement can be taken relatively shortly after the field device has been switched on.

At the same time, the second buffer capacitor 601 is charged at a rate that is delayed by the resistor 604 connected between the two capacitors 501, 601. Once the additional buffer capacitor 601 has been charged, the switch 603 located between the two buffer capacitors 501, 601 (in parallel with the charging resistor 604), can be closed in a manner controlled for example by the evaluation electronics 112, so that the two capacitors 501, 601 can now both provide the sensor electronics 111 with energy.

The process of charging the second buffer capacitor 601 can take a few minutes. If both the capacitors are operated in parallel, when the sensor electronics 111 carries out a measurement, said capacitors are not discharged to the extent they would be if only a single buffer capacitor were provided, and therefore an energetically more favourable charging process of the two capacitors can take place. Energy can thus be saved.

Figure 7:
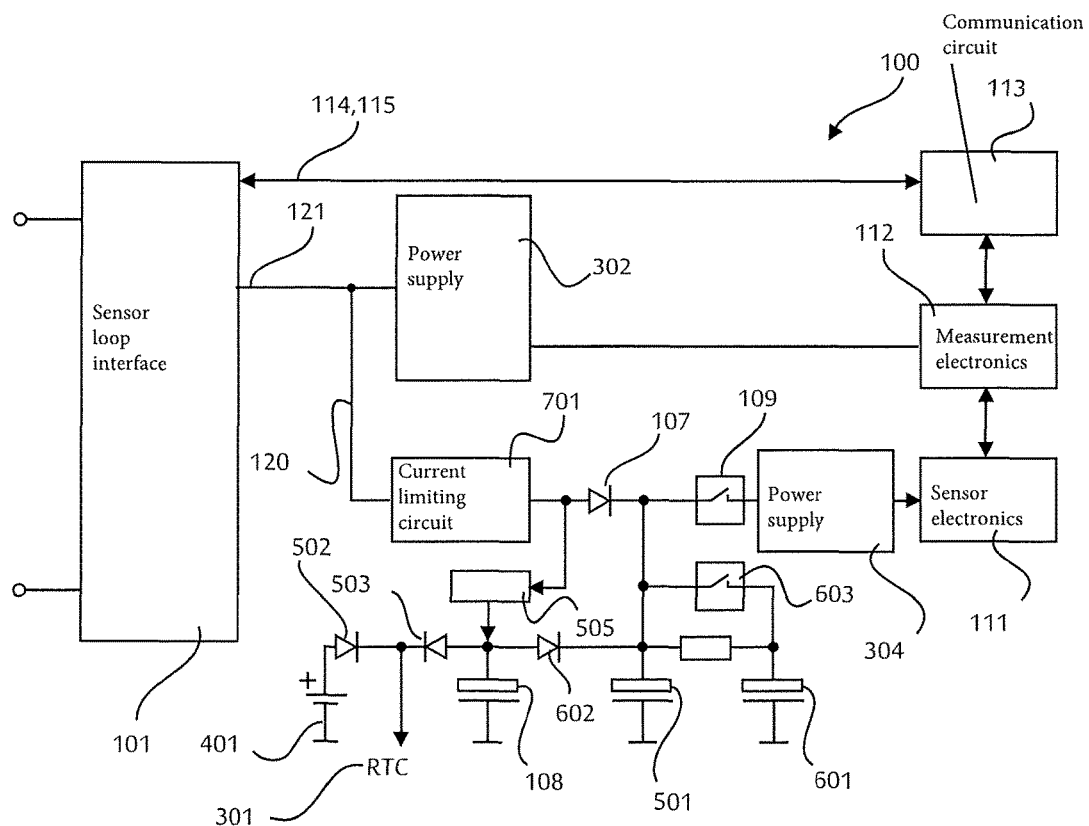
FIG. 7 is a block diagram of a fill level measurement device according to another embodiment of the invention.

FIG. 7 is a block diagram according to another embodiment of the invention. In contrast to the block diagram in FIG. 6, the fill level measurement device 100 comprises a current-limiting circuit 701 which ensures that the power supply 302 for the measurement electronics 112 and the communication circuit 113 is operated as a priority. Therefore, when switching on the fill level measurement device, these two circuit blocks 112, 113 are supplied with energy very quickly and can boot.

The storage capacitor 108 and the buffer capacitors 501, 601 obtain from the current-limiting circuit 701 only as much charge as is left over from the circuit parts 112, 113 supplied as a priority, so that the intended operation thereof can be guaranteed. As a result of the long-term energy store 108, this shortage of energy for the buffer capacitor 501 is less of a disadvantage. It is thus ensured that the measurement electronics 112 boots quickly and also that enough buffer charge is quickly available in the buffer capacitor 501 in order to carry out a measurement.

The current limitation 701 takes place upstream of the capacitor arrangement 108, 501, 601 in the branch 120 which branches off directly from the supply line 121 upstream of the power supply unit 302 for the communication circuit 113 and measurement electronics 112.

Figure 8:
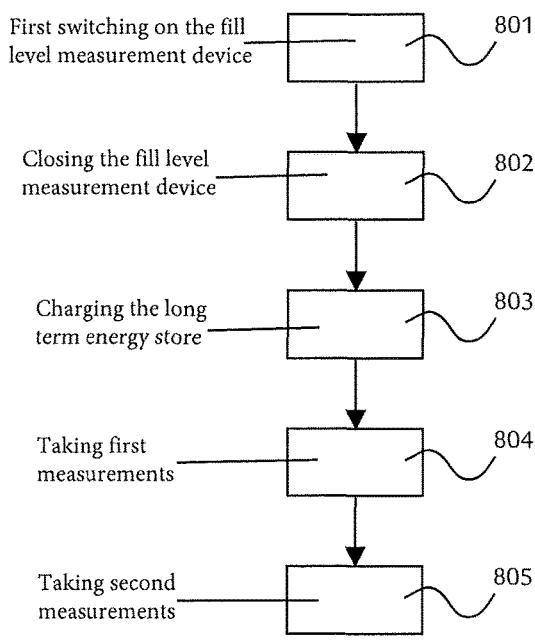
FIG. 8 is a flowchart of a method according to an embodiment of the invention.

FIG. 8 is a flowchart of a method according to one embodiment of the invention. The fill level measurement device is first switched on 801, and a switching unit 109 which is arranged between a long-term energy store 108 and sensor electronics 111 of the fill level measurement device is then closed 802 in order to make it possible for current to flow from the long-term energy store towards the sensor electronics.

The long-term energy store is then charged 803 by means of an external energy supply which also supplies energy to the sensor electronics 111, the measurement electronics 112 and the communication circuit 113 of the fill level measurement device.

The communication circuit 113 and the measurement electronics 112 are supplied with sufficient energy from the external energy supply directly after the fill level measurement device has been switched on, in order to carry out a boot process of the device. A buffer capacitor 501 is charged using the surplus energy from the external energy supply and the buffer capacitor is charged by the long-term energy store 108 at the same time.

After or even during the process of charging the first buffer capacitor 501, first measurements 804 can be taken by the sensor electronics 111 with energetic support from the first buffer capacitor 501. At the same time, a second buffer capacitor 601 can be charged using surplus energy from the external energy source, followed by second measurements 805 being taken by the sensor electronics 111 with the support of the two buffer capacitors 501, 601.

It should be pointed out that said switching units 109, 402, 504, 603 are preferably electronic switching units, for example in the form of transistors or analogue switches. The switching signals for activating or deactivating the electronic switching units are preferably generated inside the circuit of the measurement device 100. For example, a digital control unit (CPU: central processing unit) arranged in the measurement electronics 112 can emit corresponding switching signals. Likewise, specific voltages inside the measurement device are suitable as switching signals. The switching unit 109 can preferably be activated by a voltage that is derived from the voltage at the connection 118, for example.

It should also be noted that "comprising" and "having" do not exclude the possibility of other elements or steps, and the indefinite article "a" or "an" does not exclude the possibility of a plurality. It should further be noted that features or steps which have been described with reference to one of the above embodiments may also be used in combination with other features or steps of other above-described embodiments. Reference numerals in the claims should not be treated as limiting.

The invention claimed is:

1. A fill level measurement device comprising:
   a connection for an external energy supply;
   sensor electronics for detecting an electrical sensor signal, from which a fill level can be deduced;
   a long-term energy store which is configured to be charged by the external energy supply and is designed as a source of energy for charging a buffer capacitor or for directly compensating for a fluctuating energy consumption of the fill level measurement device;
   a first component which connects the long-term energy store with the external energy supply and is configured to prevent current from flowing from the long-term energy store towards the connection; and
   a second component which connects the long-term energy store with the sensor electronics and is configured to prevent current from flowing from the long-term energy store towards the sensor electronics when the fill level measurement device is not supplied with energy by the external energy supply.

2. The fill level measurement device according to claim 1, wherein the first component is a diode or a switch.

3. The fill level measurement device according to claim 1, wherein the second component is a switch.

4. The fill level measurement device according to claim 1, wherein the external energy supply is a two-wire loop, by which the fill level measurement device can be supplied with energy for a measurement operation and by which a measured value can be communicated.

5. The fill level measurement device according to claim 4, wherein the two-wire loop is a 4-20 mA two-wire loop.

6. The fill level measurement device according to claim 1, wherein the long-term energy store is designed to supply energy to an element of the fill level measurement device when the fill level measurement device is switched off.

7. The fill level measurement device according to claim 1, further comprising:

a battery and a switch which connects the battery to the long-term energy store;
wherein the battery and the switch are designed to supply the long-term energy store with energy only when the fill level measurement device is switched off.

8. The fill level measurement device according to claim 1, further comprising:
a buffer capacitor for compensating for the fluctuating energy consumption of the fill level measurement device;
a switch which connects the long-term energy store to the buffer capacitor and is designed such that the long-term energy store charges the buffer capacitor after the fill level measurement device is switched on.

9. The fill level measurement device according to claim 1, further comprising:
a first buffer capacitor for compensating for the fluctuating energy consumption of the fill level measurement device; and
a second buffer capacitor, which is connected in parallel with the first buffer capacitor and is connected, unlike the first buffer capacitor, to the connection via a resistor to delay a process of charging the second buffer capacitor.

10. The fill level measurement device according to claim 1, further comprising:
a communication circuit;
measurement electronics; and
a current-limiting circuit designed to supply the long-term energy store only with the energy from the external energy supply that is not required by the communication circuit and the measurement electronics.

11. A method for operating a fill level measurement device and for carrying out first measurements once said device has been switched on, comprising:
preventing current from flowing from a long-term energy store towards an external energy supply by a first component which connects the long-term energy store with the external energy supply;
preventing current from flowing from the long-term energy store towards sensor electronics when the fill level measurement device is not supplied with energy by the external energy supply by a switch which connects the long-term energy store with the sensor electronics;
switching on the fill level measurement device;
closing the switch, which is arranged between the long-term energy store and the sensor electronics of the fill level measurement device, in order to allow current to flow from the long-term energy store towards the sensor electronics; and
charging the long-term energy store by the external energy supply which also supplies energy to the sensor electronics, measurement electronics and a communication circuit of the fill level measurement device.

12. The method according to claim 11, further comprising:
supplying the communication circuit and the measurement electronics with sufficient energy from the external energy supply directly after the fill level measurement device has been switched on, in order to carry out a boot process;
charging a first buffer capacitor with surplus energy from the external energy supply;
simultaneously charging the buffer capacitor by means of the long-term energy store;
simultaneously charging a second buffer capacitor with surplus energy from the external energy source;
carrying out first measurements by the sensor electronics with energetic support from the first buffer capacitor, before the second buffer capacitor is charged; and
carrying out second measurements by the sensor electronics with the support of both buffer capacitors.

* * * * *